F. KUHN.
ELECTRIC FOOT WARMER.
APPLICATION FILED SEPT. 11, 1911.
1,025,144.
Patented May 7, 1912.
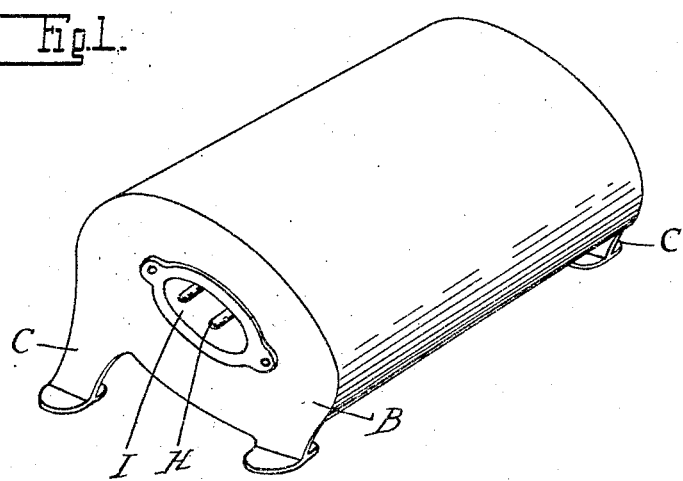
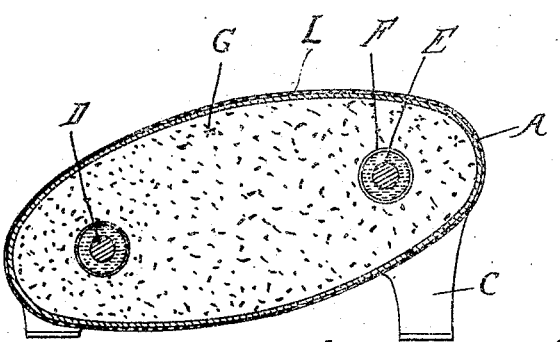
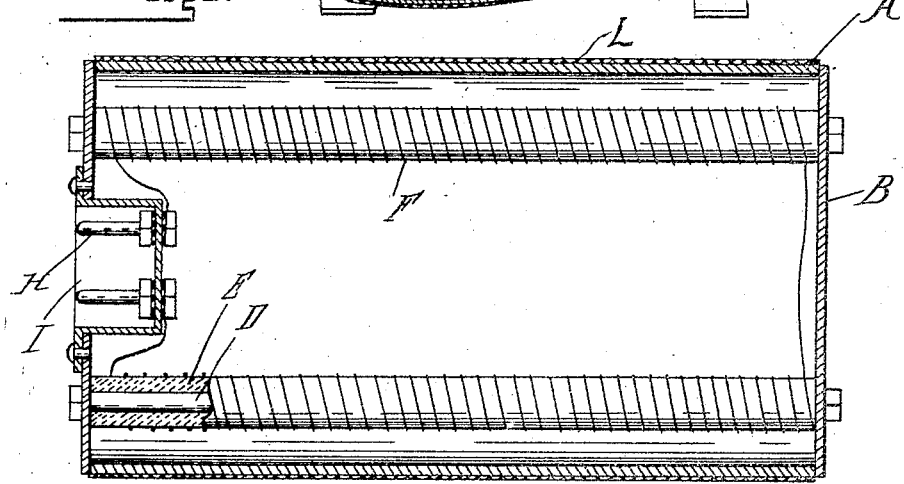
Witnesses
Inventor
Frank Kuhn

UNITED STATES PATENT OFFICE.

FRANK KUHN, OF DETROIT, MICHIGAN, ASSIGNOR TO AMERICAN ELECTRICAL HEATER COMPANY, OF DETROIT, MICHIGAN, A CORPORATION OF MICHIGAN.

ELECTRIC FOOT-WARMER.

1,025,144. Specification of Letters Patent. Patented May 7, 1912.

Application filed September 11, 1911. Serial No. 648,687.

*To all whom it may concern:*

Be it known that I, FRANK KUHN, a citizen of the United States of America, residing at Detroit, in the county of Wayne and State of Michigan, have invented certain new and useful Improvements in Electric Foot-Warmers, of which the following is a specification, reference being had therein to the accompanying drawings.

The invention relates to electric foot warmers, being more particularly designed for use in connection with motor vehicles, and the invention consists in the construction as hereinafter set forth.

In the drawings,—Figure 1 is a perspective view of the device; Fig. 2 is a cross section thereof; Fig. 3 is a longitudinal section.

At the present day automobiles not in use are generally stored in garages which are usually provided with an electric service.

My improvement is particularly designed in view of this condition and consists in a suitable casing containing a heat absorbent material and an electric heating unit embedded therein with terminal connections by which it may be quickly attached to an ordinary electric service, as for instance a lamp socket. Thus the warmer may if desired, be left permanently in the vehicle and during the hours in which it is in the garage may be stored with heat for use during the hours of service.

As preferably constructed, A is a hollow case which may be formed of an oval tube of sheet metal having heads B at the opposite ends thereof with supporting feet C thereon. Extending between these heads are one or more connecting rods D, and sleeved upon each of these rods is an insulation E around which the heating coil F may be placed. The space within the body surrounding the heaters is then filled with some heat absorbing and preferably electrical insulating substance G, such for instance as ordinary silica sand. Suitable electric terminals H are provided for the heating units and these are preferably arranged in a recess I formed in one of the heads where they may be engaged by a suitable extension cord terminal. The casing A is preferably surrounded by an outer cloth covering such as L.

With the construction as described, whenever the automobile is in the garage, the foot warmer may be connected up with electric service, and as the current consumption by the electric units is preferably low the heat will be gradually generated and stored in the mass of sand. Thus when the automobile is again taken out sufficient heat will be stored to maintain the device warm for a comparatively long time.

What I claim as my invention is:

1. An electrically heated warming device comprising a casing consisting of end heads, and a tubular body, one of said end heads having a central recessed portion, cross rods positioned on opposite sides of said recessed portion and extending within said casing and connecting said heads, insulating sleeves upon said rods, an electrical resistance wound upon said sleeves, terminals for said resistance positioned in said recessed portion, and a filling of granular electrical insulating heat absorbing body surrounding said heating unit and filling said casing.

2. An electrically heated warming device comprising a casing consisting of end heads and a tubular body, feet on said end plates for holding said casing in inclined position rods connecting said end heads, said rods being of greater length than said tubular body and extending therethrough, an insulating sleeve upon said rods, an electrical heating unit upon said sleeve, and a filling of granular electrical insulating heat absorbing body surrounding said heating unit and filling said casing.

In testimony whereof I affix my signature in presence of two witnesses.

FRANK KUHN.

Witnesses:
JAMES P. BARRY,
C. B. BELKNAP.